March 12, 1940. H. E. DAVIS ET AL 2,192,897
MACHINE FOR MAKING SUCKERS
Filed March 12, 1937 3 Sheets-Sheet 1

Inventor.
Harry E. Davis and
Oscar Werner
BY
ATTORNEY.

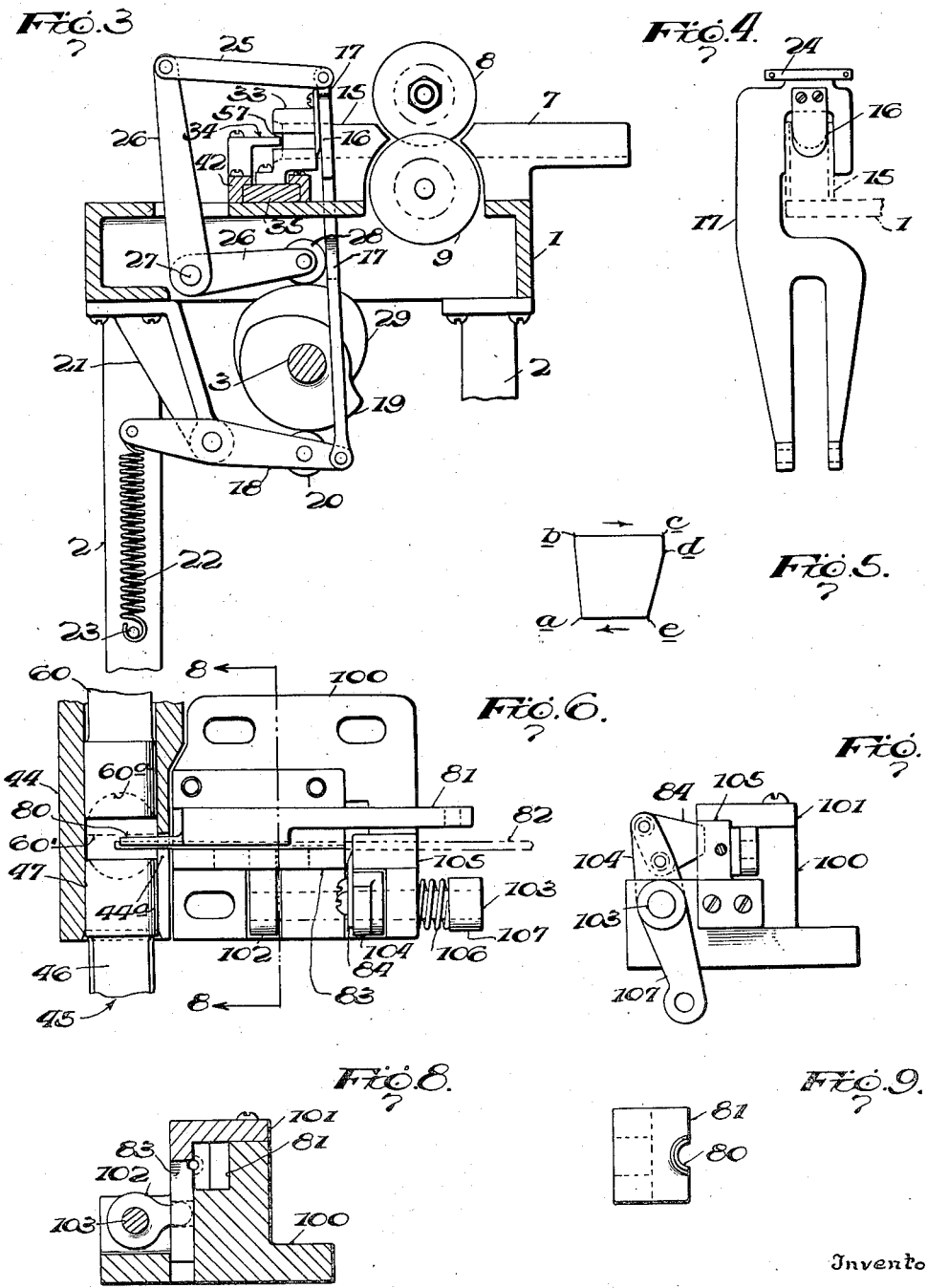

March 12, 1940.   H. E. DAVIS ET AL   2,192,897
MACHINE FOR MAKING SUCKERS
Filed March 12, 1937   3 Sheets-Sheet 3
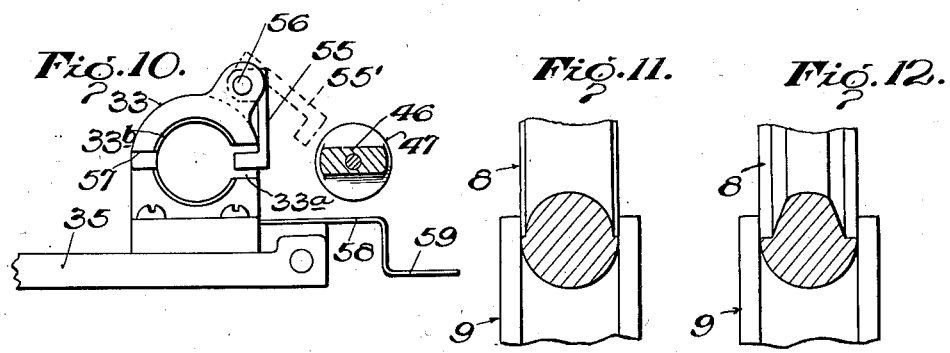
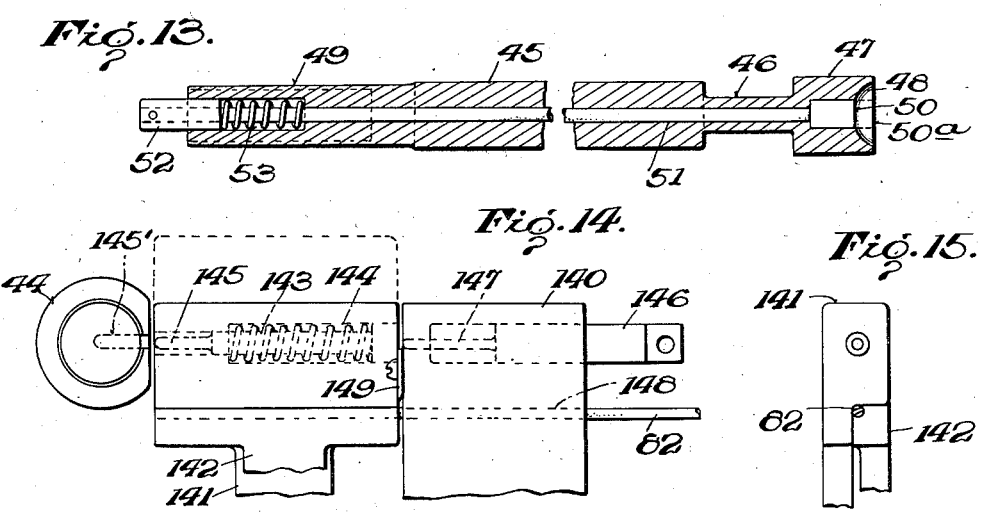
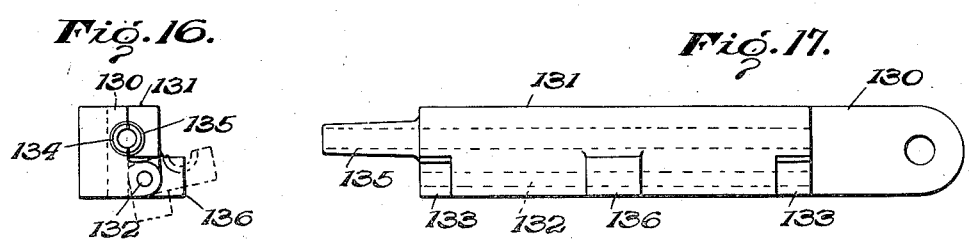
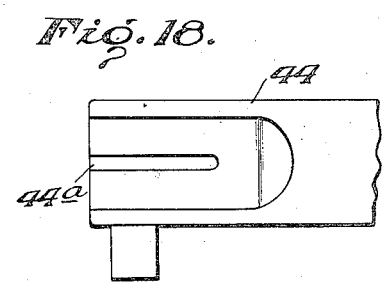
Inventor.
Harry E. Davis and
Oscar Werner
BY
N. O. Pansey
ATTORNEY.

Patented Mar. 12, 1940

2,192,897

REISSUED

UNITED STATES PATENT OFFICE 2,192,897

MACHINE FOR MAKING SUCKERS

Harry E. Davis, Akron, and Oscar Werner, Cuyahoga Falls, Ohio; The St. Joseph Loan & Trust Co., executor of Oscar Werner, deceased Application March 12, 1937, Serial No. 130,602

22 Claims. (Cl. 107—8)

This invention relates to confection machines and more particularly to a machine for automatically producing confections of the sucker or lollipop type.

One of the objects of the present invention is to provide a novel automatic sucker machine which is especially adaptable for securing a flexible handle or stick to a confection thereby producing a sucker having highly desirable safety features.

Another object of the invention is to provide, in a machine of the above character, a novel arrangement employing a cutting mechanism for successively cutting from a candy roll small pieces of the semi-plastic confection, the arrangement being so constituted that the pieces are thereafter conveyed to a molding apparatus.

Another object is to provide a novel means for securing a flexible handle to the semi-plastic confection which will avoid the necessity of forming a handle receiving recess in a preformed candy piece.

Still another object is to provide an arrangement in a machine of the character referred to, whereby the flexible handle is rigidly supported during a portion of the step of molding the confection, thus enabling the confection to be firmly pressed into contact with the handle.

A further object is to provide, in an automatic sucker machine, a novel die mechanism so constituted as to not only rapidly and efficiently impart the desired shape to the confection piece while forming the piece around the flexible handle, but also to positively eject the completed article from the machine.

A still further object is to associate with the confection machine a continuous source of supply of flexible handle stock and to provide a novel guiding structure for the stock, as well as a novel construction for cutting the stock into handle lengths for connection with the candy.

A further object is to perform the above and other operations in an automatic and coordinated manner to the end that the complete formation of safety suckers will be carried out without any attention on the part of the operator other than that required to assure a supply of candy and handle stock.

Other objects and novel features of the invention will appear more fully hereinafter from the following detailed description when taken in connection with the accompanying drawings, illustrating certain preferred embodiments of the invention. It is to be expressly understood, however, that the drawings are employed for purposes of illustration only and are not to be taken as a definition of the limits of the invention, reference being had for this purpose to the appended claims.

In the drawings, wherein similar reference characters refer to similar parts throughout the several views:

Fig. 3 is a vertical section taken on lines 3—3 of Fig. 1;

Fig. 4 is a detail of the confection cutting knife;

Fig. 5 is a diagrammatic view illustrating the operation of the knife shown in Fig. 4;

Fig. 6 is a top view, partly in section, of the stick handling mechanism;

Fig. 7 is a side view of the mechanism of Fig. 6;

Fig. 8 is a vertical section on lines 8—8 of Fig. 6;

Fig. 9 is an end view of the stick or handle guide shown in Figs. 6, 7 and 8;

Fig. 10 is a detail of the transfer slide;

Fig. 11 is a partial view of the candy feed rolls showing one shape of the candy roll produced thereby;

Fig. 12 is a partial view similar to Fig. 11 but showing an alternate shape of candy roll which may be utilized;

Fig. 13 is a sectional view of one of the die plungers;

Fig. 14 illustrates a modified form of stick feeding mechanism;

Fig. 15 shows a partial end view of the mechanism of Fig. 14;

Figs. 16 and 17 illustrate another form of stick feeding mechanism, and

Fig. 18 is a partial side view of the sucker forming cylinder.

In general, an automatic sucker forming machine constructed in accordance with the principles of the present invention includes a pair of feed rolls for feeding the semi-plastic candy material into the machine, a knife for cutting off the candy material into pieces of the desired size, a transfer mechanism adapted to receive the cut-off portion of the candy and transfer the same to a position in line with the cylinder within which the sucker is formed, die plungers for transferring the candy from the transfer mechanism to the forming cylinder, means for cutting a flexible handle stock to the desired length, means for associating the handle length with the candy, means for forming the candy on the handle to produce the finished sucker, and means for delivering the latter from the machine.

Figure 1:
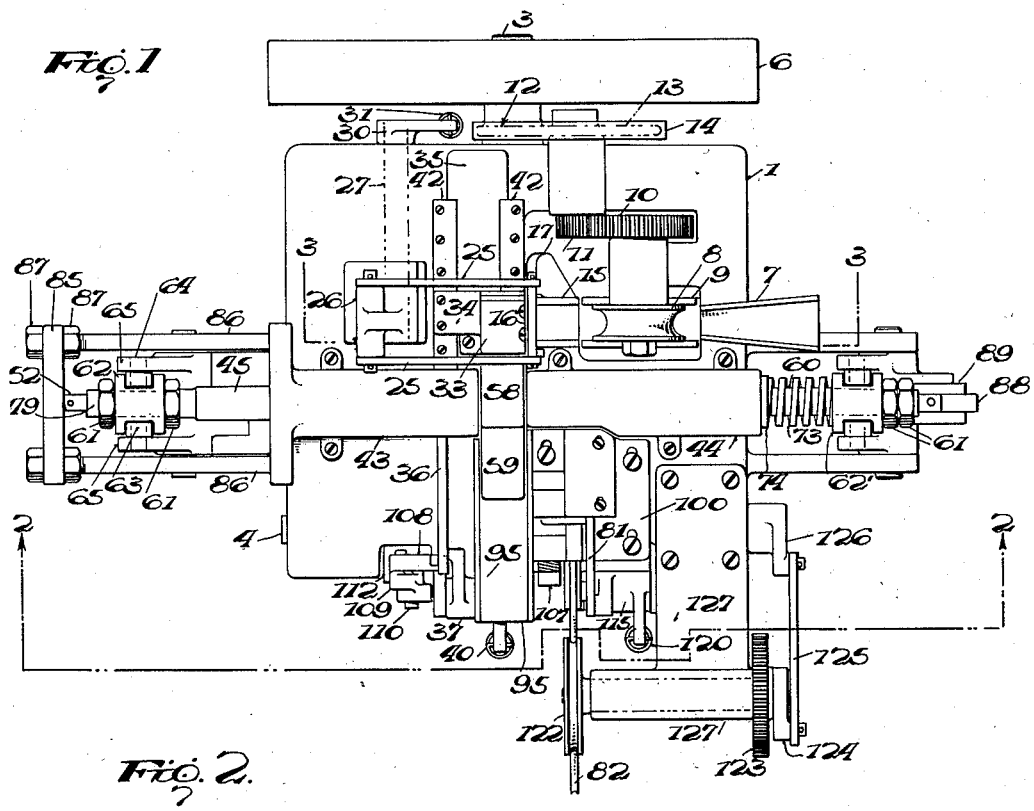
Fig. 1 is a top view of an automatic sucker machine constructed in accordance with the present invention.
Figure 2:
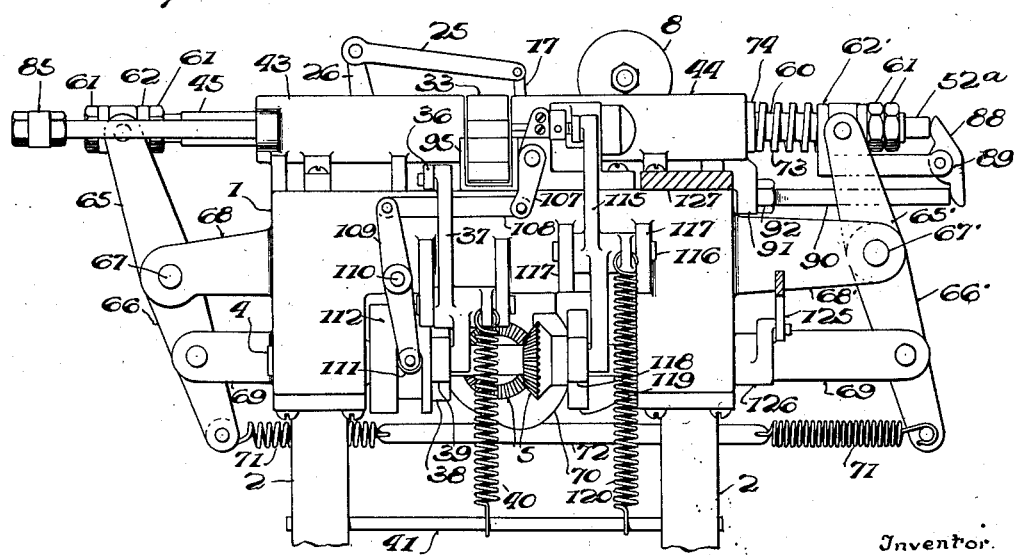
Fig. 2 is a front elevation thereof taken on line 2—2 of Fig. 1.

Referring more particularly to Figs. 1 and 2, a base 1 mounted on standards 2 supports at its lower side, as by means of suitable bearings, a main cam shaft 3 and an auxiliary cam shaft 4. The cam shaft 4 is positioned at right angles to cam shaft 3 and is driven therefrom by gears 5. Shaft 3 carries at its other end a flywheel pulley 6 adapted to be belted to a line shaft or electric motor, not shown.

The candy material, for the manufacture of suckers, is fed into the machine in the shape of a conventional heavy roll through a trough 7, and enters feed and sizing rolls 8 and 9 which impart to the material the alternate shapes shown in Figs. 11 and 12. These sizing rolls are continuously driven by the pulley 6 through gears 10 and 11, and sprockets 12 and 13 connected by chain 14. The rolls may be corrugated, provided with projecting pins, or constructed in any suitable manner to prevent slipping of the candy material during feeding thereof.

After the candy material has been sized by rolls 8 and 9, it is necessary to cut the material into appropriate small pieces for subsequent treatment. Means are, therefore, provided for cutting the candy into small pieces as it leaves the sizing rolls and enters a trough 15, and in the form shown, such means are constituted by a knife 16 which not only performs the cutting feature referred to but also positively moves each piece successively to a transfer mechanism 33, to be referred to later in detail. As shown, Figs. 3 and 4, candy knife 16 is mounted on a carrier 17, the upper portion of which closely fits the outer side walls of trough 15, thereby keeping the knife in proper alignment. The lower end of carrier 17 is pivotally connected to a cam lever 18 adapted to be oscillated by a cam 19 mounted on shaft 3. Cam lever 18 is supported by a suitable bracket 21 carried by base 1 and is provided with a roller 20, maintained in contact with the contour of cam 19 by a spring 22, anchored to a rod 23 projecting from standard 2. It will be understood from this construction that cam 19 and cam follower 18 serve to impart a vertical motion to carrier 17 and the knife 16 secured thereto. In order to effect a horizontal movement of the knife 16 for the purpose of positively moving each candy piece, the upper end 24 of knife carrier 17 is connected by links 25 to the vertical arm of a cam follower 26 mounted on a shaft 27. The horizintal arm of the cam follower 26 is provided at its outer end with a roller 28 held against the contour of a cam 29, fixed to shaft 3, by lever 30 mounted on the outer end of shaft 27, see Fig. 1, the lever 30 being maintained in the position shown by a tension spring 31, anchored at its lower end to a rod, not shown, projecting from standard 2. It will thus be observed from the foregoing that cam 29 and cam follower 26 serve to impart a horizontal motion to the upper end of carrier 17. Cams 19 and 29 are so co-ordinated that the combined vertical and horizontal motion imparted to the upper end of carrier 17 causes the cutting edge of knife 16 to follow a path $a, b, c, d, e$, as shown in Fig. 5.

Referring to Fig. 5, the cutting edge of the knife, starting from position $a$, in which it is shown in Figs. 1, 2 and 3, moves upwardly at a slight angle to follow the face of transfer mechanism 33, thereby stripping off the cut-off piece of candy against the upper inner surface of the transfer mechanism, this action continuing until the knife has lost contact with the candy. The lower knife edge then travels to the right from $b$ to $c$, more or less vertically down to $d$ where it contacts the candy that has been fed in by rolls 8 and 9, and then down to $e$ at a vertical incline. Portion $d$—$e$ is the cutting stroke of the knife which is inclined at such an angle that the horizontal distance travelled in the course of the cutting stroke equals the amount of candy travel during period $d$—$e$, due to the action of rolls 8 and 9 which are continuously moving the candy roll forwardly. The knife then travels at a rapid rate from $e$ to $a$ moving the cut-off portion of the candy into transfer mechanism 33, which latter has been cleared in the meantime of the previously cut-off piece of candy. Transfer mechanism 33 being open at both ends, a stationary stop 34, Figs. 1 and 3, is provided to limit the travel of the candy piece within the transfer mechanism.

After the transfer mechanism has received a cut-off portion of candy, it is moved forwardly in order to convey the candy to the forming mechanism. For this purpose, the transfer mechanism is mounted on a slide 35, the forward end of which is connected through a link 36 to a cam lever 37, the latter being oscillated by a cam 38 mounted on the auxiliary cam shaft 4. A cam roller 39, carried by the lever 37, is held in contact with the cam contour by a tension spring 40, the lower end of which is anchored to rod 41 supported by standards 2. Brackets 42 are provided for guiding the slide 35 during its movement back and forth relative to the base 1. The above described parts are so constructed that the slide 35 and transfer mechanism 33 are moved to a position where the base of the transfer mechanism is aligned with cylinders 43 and 44. As will appear hereinafter, the candy piece is here formed into the finished article while the transfer mechanism returns to receive another cut-off candy piece, it being understood that the process is thus a continuous one.

Referring to Figs. 2, 6 and 10, after the transfer mechanism 33 has moved to its forward position, a die plunger 45, housed within cylinder 43, is moved to the right, as viewed in Fig. 2, in order to move the candy piece from the transfer mechanism a predetermined distance into the cylinder 44, see Fig. 6. For a certain interval of time, the candy piece is maintained in such position where the complete sucker is formed. During said interval, the transfer mechanism returns to its original position. To permit this latter, the transfer mechanism is provided with a slot 33$a$ in its front wall for receiving the reduced portion 46 of the plunger 45. Since the slot is slightly larger than the portion 46, it will be understood that the mechanism 33 may be returned to its original position notwithstanding the fact that the plunger 45 is momentarily stationary. A flipper 55 may be provided to close the slot in the transfer mechanism sufficiently so that the cut-off portion of candy material within 33 cannot project into the slot when the transfer mechanism is moved forwardly. This flipper may be hinged on a pin 56 mounted on an arm projectng from the transfer mechanism and may be held normally in the position shown in full lines in Fig. 10 by a torsion spring, not shown. As the transfer mechanism returns to its original position, the flipper will ride over the reduced section 46 of plunger 45, as shown in dotted lines in this figure. A notch 57 is provided to clear stop 34 which, as heretofore stated, may extend a certain distance into the transfer mechanism, see also Fig. 3. Preferably, the bore of the transfer mechanism is chamfered, as at 33b, to allow easier entry of the candy forming end of die plunger 45. A shelf 58, having a lower step 59, is attached to the forward portion of the slide 35 to receive and eject the finished sucker in a manner described hereinafter.

Plunger 45 has an enlarged forming or die head 47 which may be of any suitable cross section, depending upon the desired shape of the sucker to be formed, and said head is provided with a concaved end 48, of optional shape, see Fig. 13. The main portion of the plunger, however, is preferably round and of standard shape, regardless of the shape of head 47. The opposite end of the plunger is provided with a threaded portion 49. In order to provide an ejecting mechanism, the plunger may be bored to receive a rod 51 having at one end an enlarged head 50 and at its other end a shoulder 52 pinned to rod 51. A compression spring 53 normally holds parts 50, 51 and 52 in the position shown in Fig. 13 wherein the face of 50 is approximately flush with the concave surface 48 of the plunger head. The main portion of cylinder 43 is bored to fit the main portion 45 of the plunger and its right end portion is counterbored to closely fit the shape of the plunger head 47.

A die plunger 60, housed in cylinder 44, is similar in construction to plunger 45, except that it has no reduced portion, the plunger 60 being adapted to cooperate with the plunger 45 to form the completed sucker. As shown, the plunger 60 is provided with a sucker forming head 60a complementary to the head 48 of plunger 45, and is moreover provided with a similar ejecting mechanism including rod 52a. The bore of cylinder 44 is likewise similar to the bore of cylinder 43 except that the position of the enlarged counterbore fitting the head of plunger 60 is reversed. The bore of the transfer mechanism 33, Fig. 10, is identical with the counterbore of the enlarged portions of cylinders 43 and 44, whatever the shape of the latter may be, and closely fits head 47 of plunger 45 when the transfer mechanism is in its forward position.

Means are provided for shifting the die plunger 45 coordinately with the movement of the transfer mechanism 33 in order to move the candy piece carried by the latter into the cylinder 44 for formation of the sucker. As shown, the plunger 45 has adjustably mounted on its threaded stem 49, by means of nuts 61, a block 62, the recessed sides of which are engaged by rollers 63 rotatably mounted on pins 64, projecting inwardly from arms 65 of a cam lever 66, said cam lever being rotatably mounted on a pin 67 supported by arms 68 carried by the base 1. Cam lever 66 is adapted to be oscillated by a cam follower 69, the inner end of which contacts, by means of a roller, a cam 70 carried by the main shaft 3. It will be understood that, during operation of the machine and rotation of main shaft 3, the movement of cam 70 will displace the cam follower 69 to effect movement of the die plunger 45.

Similarly, plunger 60 is adapted to be moved within cylinder 44 by a cam lever 66' and cam follower 69', the latter being displaced by a suitable cam, not shown, also driven by shaft 3. Cam followers 69 and 69' are held in contact with their respective cams by tension springs 71, one end of each being fastened to the respective cam levers while the opposite ends are connected through rod 72. A block 62' is yieldingly mounted on the threaded portion of plunger 60, a heavy compression spring 73 being interposed between its inner face and a collar 74 abutting a shoulder on plunger 60, where its smaller threaded portion joins its main portion. Spring 73 is initially compressed by screwing up nuts 61.

After the transfer mechanism 33 has moved forwardly and has become aligned with cylinders 43 and 44, as heretofore pointed out, the plunger 60 moves rapidly to the right, as viewed in Figs. 1 and 2, while plunger 45 also moves to the right, but at a slower rate. As plunger 60 approaches the end of its outward stroke, as indicated in Fig. 6, a stick or handle guard 80 of guard carrier 81 moves rapidly into the bore of cylinder 44 through a slot 44a therein, see Fig. 18, and coincident therewith a predetermined length of flexible handle material 82 is fed in, so that both the handle guard and the handle are in position before plunger 45 reaches its extreme right-hand position. Plunger 45, moving the cut-off piece of candy material forced out of the transfer mechanism, will then force the candy around the handle and guard supporting the same, and will finally come to rest with head 47 in the position shown in Fig. 6. The handle guard is then withdrawn, the handle adhering to the candy piece, and, immediately thereafter, the plunger 60 is moved inwardly until the face of its head reaches the dotted line position 60', it being understood that, during such movement, plunger 45 remains stationary.

From the foregoing, it will be perceived that the candy will thus be compressed firmly around the end of the handle and will be properly molded, its periphery being determined by the shape of the cylinder bore and its sides being determined by the contour of the recesses formed in the heads of plungers 45 and 60. Should there be present an excess amount of candy material, then this will be compensated for by compression of spring 73. Thus, the movement of plunger 60 will be correspondingly shorter, and the sucker will be correspondingly thicker. The relatively heavy initial pressure in spring 73 insures sufficient forming pressure under all normal conditions.

Following the withdrawal of handle guard 80 and while plunger 60 is moving to the left to compress the candy, a side plate 83, which has confined the handle in a recess in carrier 81 during its inward travel, moves downwardly a sufficient distance to allow the handle to move bodily to the left, see Fig. 8. Also, while plunger 45 has been stationary, transfer mechanism 33 will have returned to the position shown in Fig. 1, in the manner described previously. After a predetermined dwell to allow the candy to assume its final shape under pressure exerted by the die plungers 45 and 60, both plungers will move to the left, plunger 45 moving more rapidly, however, than plunger 60, due to the contour of the actuating cams therefor. It will be understood that, before a concurrent movement of the die plungers takes place, the knife 84 will have operated to sever the handle attached to the candy, in the manner above described, from the supply of handle material. Thus, as the die plungers move, the completed sucker will move therewith. As plunger 45 approaches its extreme left position, collar 52 of shaft 51 will contact stop 85 supported by studs 86 projecting from brackets on cylinder 43 and secured to studs 86 by nuts 87. Collar 52, shaft 51 and plunger 50 will then be held stationary, while plunger 45 continues to travel to the left, until the face 50 of shaft 51 is flush with the face of 47. Thus, if the formed sucker has a tendency to adhere within the die cavity 48, it will be forcibly dislodged by the displacement of shaft 51 with relation to 47. A similar action of ejecting the completed sucker from the head of plunger 60 is obtained by a small rocker arm 88 carried on a forked extension 89 of block 62', see Fig. 2. As plunger 60 approaches itse extreme left position, rocker 88, carried by the block 62', will contact, at its lower end, a rod 90 projecting from bracket 91 of cylinder 44, and will be rocked thereby, thus displacing ejecting rod 52a within plunger 60 until the head thereof is flush with the head of plunger 60. The rod 90 projecting from bracket 91 may be adjusted as by screwing rod 90 in or out and locking it in adjusted position with nut 92.

After the ejecting action has been completed and the die plungers have returned to their normal position, wherein their respective faces are aligned with the inner faces of cylinders 43 and 44, the completed sucker, moved into the open gap between cylinders 43 and 44, will drop by gravity onto the shelf 58 of the transfer mechanism 33, see Fig. 10. During the next succeeding forward motion of the transfer mechanism, the sucker will then be tossed forwardly and will drop upon shelf 59, whence it will be punshed forwardly into a discharge chute 95 by the succeeding suckers until it drops off the end of the chute into a convenient receptacle.

Referring more particularly to Figs. 6, 7, 8 and 9, the mechanism for positioning the flexible handle within cylinder 44 for association with the candy piece is housed in a block 100 bolted to the upper surface of base 1. Handle guard carrier 81 is slidably mounted therein, and retained in position by a cover 101. The handle guard 80, projecting from the carrier 81, is formed by a half section of an exteriorly tapered tube and when in place prevents bending of that portion of handle 82 which projects into cylinder 44 while the candy material is being forced around it by plunger 45. The handle in its forward travel is confined by handle guard carrier 81, by sideplate 83, and by cover 101, their combinations forming a channel preventing the bending of handle 82 as it is being fed in. The slide 83 is operated by an arm 102, mounted on shaft 103, the end of said arm engaging an opening in slide 83, so that rotation of the shaft to the right will lower the slide. Also mounted on shaft 103 is a knife carrier 104, to which is secured the handle cut-off knife 84, adapted to cut off the handle as it emerges from a guide 105. The knife is preferably held against the forward smooth face of guide 105 as by a compression spring 106 which constantly urges the knife against the guide. A smooth and sharp cut-off is thus assured.

In order to actuate the shaft 103, the same is provided at its outer end with a lever 107, adapted to be oscillated by a link 108 and a cam lever 109, see Fig. 2. The cam lever 109 is rotatably mounted on a stud 110 projecting from base 1, and has at its lower end a roller 111, operatively engaged with a suitably shaped barrel cam 112 on shaft 4. It will be understood from Figs. 7 and 8 that movement of the shaft 103 in a counterclockwise direction will move the knife 84 to the position shown and will close the gate 83, thus confining the handle material as the latter is being fed inwardly to the cylinder 44. On the other hand, after plunger 45 moves the candy piece into the cylinder 44, movement of the shaft 103 in a clockwise direction will open the gate 83 while moving the knife to such a position as to sever the sucker handle from the handle stock. Preferably, the withdrawal of the handle guard 80 and carrier 81 takes place while knife 84 is maintained in its cutting position which effectively locks the handle endwise during retraction of the handle guard.

For the purpose of reciprocating the handle guard carrier 81, there is provided a cam lever 115 mounted on a pin 116 held by brackets 117 projecting from base 1, see Fig. 2. The said cam lever carries at its lower end a cam roller 118, held in contact with cam 119 on shaft 4 by the action of tension spring 120, the lower end of which is anchored to rod 41.

The handle material is preferably supplied in the form of a reel and is fed into the machine by conventional pinch rolls 122, which are intermittently rotated by gears 123, ratchet carrier 124, link 125 and crank 126, the latter being mounted at the outer end of shaft 4, while parts 122, 123 and 124 are supported by bracket 127, bolted to the top of base 1.

It will be understood that, to prevent overheating of the candy forming mechanism during continuous operation, and particularly of cylinder 44, an electric fan, or blower, not shown, may be so mounted that its air stream is directed on the part to be cooled and also on delivery trays 58 and 59 as well as discharge chute 95, in order to accelerate the "setting" and hardening of the completed suckers. Such cooling device may be started manually, when in the judgment of the operator, the proper working temperature has been reached, or may be controlled automatically by a thermostatic switch. Parts for which a higher working temperature may be found desirable, such as candy feed rolls 8 and 9, may be shielded from the air blast by suitable baffle plates or covers.

Referring more particularly to Figs. 16 and 17, a modified form of handle guard and carrier device is disclosed therein as including a handle guard which is adapted to completely enclose the end of the handle to which the candy piece is affixed. As shown, a guard carrier 130, adapted to be reciprocated by the cam lever 115 in a manner similar to the movement of guard carrier 81 heretofore described, has hingedly connected thereto an auxiliary carrier 131. The connection between members 130 and 131 includes a rod 132 mounted in brackets 133 projecting from carrier 130. Extending forwardly from the members 130 and 131 are the respective extensions 134 and 135 which cooperate, in the position shown, to form a completely closed tube for supporting the handle. It will be understood that, in utilizing such an arrangement, after the candy piece has been forced around the members 134 and 135 by operation of plunger 45, the carrier 130 including member 131 will be withdrawn from the cylinder 44, after which the operation of plunger 60 will firmly affix the candy piece to the handle end to complete the sucker.

Following the withdrawal of the handle guard above referred to, the member 131 is tilted about shaft 132, as indicated in dotted lines in Fig. 6, to permit the completed sucker to travel laterally as in Fig. 6. Any suitable mechanism may be provided for effecting the tilting movement of member 131 in timed relation to the removal of the handle guard. Preferably, however, such movement is effected by a member similar to member 102, see Fig. 8, the projecting arm of which is adapted to engage a lip provided on member 131.

A further embodiment of the handle mechanism is disclosed in Figs. 14 and 15, and, in this form, the construction is such that the handle is inserted in a preformed opening made in the semi-plastic candy piece, after which the candy is pressed into intimate engagement with the handle end in the manner heretofore described. As shown in these figures, a stationary block 140 is positioned adjacent block 141 and a slide 142, these last mentioned members being adapted to be moved vertically with relation to the cylinder 44, by means of suitable cam levers, not shown. A plunger 143 having a forming head 145, slightly larger in diameter than the handle material, is slidably mounted in block 141 and is normally maintained in the position shown as by means of a compression spring 144. Aligned with the plunger 143 is a projector 146 which may be reciprocated by a rod or cam lever, not shown, secured to the outer end of the projector and operated from the shaft 3. The forward end of the projector is formed as an extension 147 of approximately the same diameter as the handle material. As shown, the handle material is introduced through bore 148 in block 140, the said bore being in line with a channel formed by the lower recess of block 141 and the notched upper left corner of the slide 142, see Fig. 15. A cut-off knife 149 is mounted on the front face of the stationary block 140 and in intimate contact with the polished rear faces of block 141 and slide 142.

In the operation of the above described structure, the projector 146 is moved inwardly, thus moving plunger 143 to the left, as viewed in Fig. 14, to cause head 145 to form a suitable opening or hole in the candy piece. This action in preforming the hole for subsequent reception of the handle may take place previously, to during or immediately following the shaping of the candy piece within cylinder 44 by the action of plungers 45 and 60. Following the formation of the hole in the candy piece, the plunger 60 is preferably retracted a slight distance in order to relieve the pressure on the candy, and coincidentally, the parts 143 and 146 are returned to the position shown. In the meantime, a length of handle material 82 has been fed in by the feed rolls so that the end of the handle is approximately flush with the left-hand faces of members 141 and 142, as viewed in Fig. 14. Members 141 and 142 are now moved upwardly in unison, this action effecting a cutting of the handle material by reason of the stationary knife 149.

When members 141 and 142 reach the position where the handle becomes aligned with the center line of cylinder 44, further upward movement ceases and the projector 146 will move the handle into the hole in the candy piece, the projector being withdrawn immediately after it has effected the necessary movement of the handle. The plunger 60 will thereafter complete the formation of the sucker and will move the latter out of the cylinder 44, following a slight downward movement of the slide 142 for freeing the handle 82.

Though the invention hereinbefore described is particularly adaptable for manufacturing suckers from flexible handle material furnished in reel form, it is to be understood that the machine is equally adaptable for use with handles of precut length. In such case, it would be only necessary to replace the pinch rolls 122 by a magazine for holding the handles together with a suitable plunger for inserting the handles into the feeding mechanism 81 or 141. Such magazine and plunger may be of conventional form and mounted upon the base 100.

There has thus been provided by the present invention a novel means and method for manufacturing suckers which is especially adapted to that class of suckers known as the safety type which embody flexible handles. One of the important features of the invention resides in the provision of the handle guard, and it will be appreciated that such an arrangement provides a rigid support for the flexible handle, thus enabling efficient molding of the candy piece around handles of a flexible nature. The knife employed in the present invention for cutting off successive candy pieces not only performs such cutting action as is necessary, but also functions to convey the candy to the transfer mechanism and to positively strip the same thereinto, thereby greatly simplifying the step of conveying the candy to the forming dies. The construction and manner of operation of the die plungers, it will be appreciated, contributes largely to the rapid and continuous operation of the machine, in permitting the return of the transfer mechanism for reception of a subsequent candy piece while proceeding with the completion of a sucker. A further highly desirable feature resides in the completion and positive ejectment of the sucker in such timed relation with the movement of the transfer mechanism that the finished article is moved from the machine when the transfer mechanism returns with another candy piece.

The provision of the continuous length of flexible handle material and the method and apparatus for feeding the material and for cutting off successive handle lengths avoids the necessity of having a magazine of precut handles, thereby simplifying the process to a marked degree.

While several embodiments of the invention have been shown and described herein with a certain degree of particularity, it is to be understood that various changes may be made without departing from the spirit of the invention. For example, if desired, the relative timing of the motions of the candy cut-off knife and the transfer mechanism may be so altered that, as soon as the knife has moved the candy piece into the transfer mechanism, the latter moves forwardly, thereby stripping the candy from the knife by a lateral motion instead of a vertical motion as previously described. Furthermore, if desired, the handle guard, for shielding or supporting the handle in Fig. 6, may be rotated 180° from its position shown in this figure in order to shield the handle from the pressure of the candy produced by the die plunger, instead of supporting the handle against such pressure. Various other changes in the shape, size, arrangement of the component parts and timing of the operations thereof may be resorted to, as well understood by those skilled in the art. Reference will, therefore, be had to the claims appended hereto for a definition of the limits of the invention.

What is claimed is:

1. A sucker machine comprising means for forming and feeding a semi-plastic candy roll, a transfer mechanism, a single means for cutting a candy piece from said roll and for positively moving said piece into said transfer mechanism, means for molding said candy piece upon the end of a handle, and means for moving said transfer mechanism to convey said candy piece to the molding means.

2. In a sucker machine having means for forming a semi-plastic candy roll and for feeding said roll at a predetermined rate of speed, a transfer mechanism, a candy cutting device, means for operating said device to cut off a candy piece from the moving candy roll, means for operating said device to positively move the latter and the candy piece to the transfer mechanism at a rate of speed greater than the rate of speed of movement of the candy roll, means for molding said candy piece upon the end of a handle, and means for moving said transfer mechanism to convey said candy piece to the molding means.

3. In a sucker machine having means for forming a semi-plastic candy roll and for feeding said roll at a predetermined rate of speed, a transfer mechanism, a candy cutting device, means for operating said device to cut off a candy piece from the moving candy roll, and means for operating said device to positively move the latter and the candy piece into the transfer mechanism at a rate of speed greater than the rate of speed of movement of the candy roll, said first operating means moving said device against the transfer mechanism for stripping said candy piece from said device.

4. A sucker machine comprising means for forming and feeding a semi-plastic candy roll, a transfer mechanism, a single means for cutting a candy piece from said roll and for positively moving said piece into said transfer mechanism, means for molding said candy piece upon the end of a handle, and a single means for moving said transfer mechanism to convey said candy piece to the molding means and for returning said mechanism to receive a succeeding cut-off candy piece.

5. A sucker machine comprising a pair of rolls for forming and feeding a semi-plastic candy roll, a transfer mechanism, means for cutting and conveying a candy piece from said roll to said mechanism, a sucker forming and handle positioning apparatus, means for moving the transfer mechanism adjacent said apparatus, means projectible through said mechanism for moving the candy piece to the apparatus, and means for returning said mechanism to receive a succeeding candy piece.

6. A sucker machine comprising a pair of rolls for forming and feeding a semi-plastic candy roll, a transfer mechanism, means for cutting and conveying a candy piece from said roll to said mechanism, a sucker forming and handle positioning apparatus, means for moving the transfer mechanism adjacent said apparatus, means projectible through said mechanism for moving the candy piece to the apparatus, and means for returning said mechanism to receive a succeeding candy piece while maintaining said projectible means in its projected position.

7. A sucker machine comprising a pair of rolls for forming and feeding a semi-plastic candy roll, means for cutting a candy piece from said roll, a sucker forming and handle positioning apparatus, means for conveying said candy piece to a point adjacent said apparatus, and means projectible through said conveying means for forcing said candy piece toward said apparatus.

8. In a machine for forming a sucker from a semi-plastic candy piece and a flexible handle, means for rigidly supporting one end of the flexible handle, means for pressing the semi-plastic candy piece against one side of the supported handle end, means for withdrawing the supporting means from said handle end, and means for pressing the semi-plastic candy piece against the opposite side of the handle end.

9. In a machine for forming a sucker from a semi-plastic candy piece and a flexible handle, means for rigidly supporting one end of the flexible handle, means for exerting a predetermined pressure against the semi-plastic candy piece to force the same against one side and partially around the supported handle end, means for withdrawing the supporting means from the handle end, and means for exerting a pressure upon the semi-plastic candy piece to force the same against the opposite side of the handle end while maintaining said first named means in its predetermined pressure-applied position.

10. A sucker machine comprising candy handling means having a recess for receiving a semi-plastic candy piece preparatory to connecting the said piece to a flexible handle, means for bringing a flexible handle material adjacent said first means, means for supporting said material throughout its length, means for moving said candy handling means toward the side of one end of said supported handle material to force said candy against and around said side, a second candy handling means having a recess complementary to said first recess, means for removing said supporting means from the said end of the handle material, means for moving said second candy handling means against the opposite side of said end of the handle material whereby the recesses of both said candy handling means cooperate to form a sucker of the desired size and shape and effect adherence between the sucker and handle material, and means for ejecting the sucker from the candy handling means.

11. In a confection machine for forming suckers, candy forming means, means for feeding a flexible handle material from a supply to said first named means, means for operating said first named means to mold a candy piece about one end of said flexible handle material, a guard for rigidly supporting said end during a portion of the molding operation, said guard being removable from said end prior to completion of the molding operation, and means for severing the handle from said supply and for locking the handle endwise during removal of said guard.

12. In a sucker machine, confection forming apparatus, a reel of elongated flexible handle material, means for inserting the free end of said handle material into said apparatus for connection with a candy piece therein, means for rigidly supporting at least one side of said free end during operation of the apparatus, and means for severing from said handle material a handle of appropriate length including said end.

13. In a continuously operating sucker machine having means for forming and feeding a candy roll, means for cutting off a candy piece from said roll, means for forming a sucker from said candy piece and for attaching the same to a handle, transfer means for said candy piece, means for moving said transfer means and candy piece to said forming means to deliver the candy piece to the latter and for returning the transfer means for a successive candy piece, and means for coordinating the operation of the transfer means and forming means to cause an ejectment of the completed sucker by the transfer means during movement of the latter toward the forming means with the successive candy piece.

14. In a sucker machine, confection forming apparatus comprising a pair of cooperating die plungers, means for feeding a semi-plastic candy piece between said plungers, means for feeding one end of a handle between said plungers, means for urging said plungers together to mold the candy piece around said end of the handle to form the completed sucker, and means associated with each plunger for positively ejecting the sucker therefrom.

15. In a machine for forming a sucker from a semiplastic candy piece and a flexible handle, means for rigidly supporting one end of the flexible handle, die means for forming said candy piece around said supported end, means for removing said supporting means, means for further pressing said candy piece around said handle end to complete the sucker, and means for ejecting the completed sucker from the die means.

16. In a confection machine for forming suckers, candy forming means, means for positioning a normally straight flexible handle adjacent said first named means, means independent of said first named means for supporting said handle; and means for operating said first named means to mold a candy piece about one end of said flexible handle.

17. In a sucker machine for forming suckers from a semi-plastic confection and handles, confection forming apparatus comprising a plurality of cooperating die plungers, means for feeding a semi-plastic candy piece between said plungers, means for feeding one end of a handle between said plungers, and means for thereafter effecting relative movement between said plungers to mold the candy piece around said end of the handle to form a completed sucker.

18. In a sucker machine for forming suckers from a semi-plastic confection and flexible handles of the type which are sufficiently rigid to support a candy piece in an upright position but sufficiently flexible to bend under the application of a relatively slight endwise pressure, confection forming apparatus comprising a pair of cooperating die plungers, means for feeding a semi-plastic candy piece between said plungers, means for feeding one end of a handle between said plungers, and means for operating said plungers to thereafter mold said candy piece about the end of said handle.

19. In a sucker machine for forming suckers from semi-plastic candy and handles, confection forming apparatus comprising a plurality of cooperating die plungers, means for feeding a semi-plastic candy piece between said plungers, a separate plunger movable between said first named plungers, means for operating said first named plungers to move the candy piece against the end of said second named plunger, means for withdrawing said second named plunger, means for feeding one end of a handle between said first named plungers and inserting said handle in the opening formed in the candy piece by withdrawal of said second named plunger, and means for further operating the first named plungers to mold the candy piece around the end of the handle.

20. In a sucker machine for forming suckers from semi-plastic candy and flexible handles, confection forming apparatus comprising a plurality of cooperating die plungers, means for feeding a semi-plastic candy piece between said plungers, means for moving said plungers together to mold the candy piece, a separate plunger movable into said candy piece to form a hole therein, flexible handle feeding means, means to withdraw said separate plunger, means to operate said flexible handle feeding means to insert one end of a flexible handle into the opening formed in the candy piece, and means to operate said first plungers to firmly compress and mold said candy piece about the end of said flexible handle.

21. In a sucker machine for forming suckers from a semi-plastic candy material and flexible handles, confection forming apparatus comprising a plurality of cooperating relatively movable die members, means for feeding a semi-plastic candy piece between said die members, means for moving a flexible handle along its major axis and for positioning the same in such manner that one end thereof is located between said die members, and means for thereafter moving at least one of said die members along its axis to effect relative movement between said die members and to mold the candy piece about the end of the flexible handle.

22. In a confection machne for forming suckers, candy formng means comprisng a pair of cooperating axially aligned die members, means for positioning one end of a handle between said members, means for feeding a semi-plastic candy piece between said members whereby said candy piece may be molded about said handle end, and means for thereafter effectng relative movement between said members in a direction coincident with the aligned axes thereof for enabling discharge of the completed sucker.

HARRY E. DAVIS.
OSCAR WERNER.